(12) United States Patent
Okuda et al.

(10) Patent No.: US 6,795,144 B1
(45) Date of Patent: Sep. 21, 2004

(54) MODULE FOR REFLECTION TYPE LIQUID CRYSTAL DISPLAY DEVICE, METHOD OF MANUFACTURING THE SAME, AND REFLECTION TYPE LIQUID CRYSTAL DISPLAY DEVICE

(75) Inventors: Shoji Okuda, Kasugai (JP); Makoto Ohashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/721,098

(22) Filed: Nov. 22, 2000

(30) Foreign Application Priority Data

Feb. 28, 2000 (JP) ........................................ 2000-051631

(51) Int. Cl.[7] ............................................. G02F 1/1333
(52) U.S. Cl. ....................... 349/113; 349/137; 349/138
(58) Field of Search ................................ 349/113, 137, 349/138

(56) References Cited

U.S. PATENT DOCUMENTS

| | | | |
|---|---|---|---|
| 5,737,050 A | | 4/1998 | Takahara et al. |
| 5,978,056 A | * | 11/1999 | Shintani et al. ............. 349/137 |
| 6,005,651 A | | 12/1999 | Takahara et al. |
| 6,017,780 A | * | 1/2000 | Roy ........................... 438/152 |
| 6,037,197 A | * | 3/2000 | Yamazaki et al. ........... 348/151 |
| 6,121,151 A | * | 9/2000 | Chen et al. .................. 349/122 |
| 6,124,912 A | * | 9/2000 | Moore ......................... 349/112 |
| 6,277,747 B1 | * | 8/2001 | Schifko et al. ............. 438/689 |
| 6,300,241 B1 | * | 10/2001 | Moore et al. ............... 438/637 |
| 6,429,132 B1 | * | 8/2002 | Haskell et al. ............. 438/692 |

FOREIGN PATENT DOCUMENTS

| | | | |
|---|---|---|---|
| JP | 406347828 A | * | 12/1994 |
| JP | 8-122761 | | 5/1996 |
| JP | 8122761 | * | 5/1996 |

OTHER PUBLICATIONS

N. Tanaka et al. —Silicon chip liquid crystal of IBM in U.S.A.; Jul. 1997, Nikkei Microdevices, pp116–119.

* cited by examiner

*Primary Examiner*—Toan Ton
*Assistant Examiner*—Hoan Nguyen
(74) *Attorney, Agent, or Firm*—Greer, Burns & Crain, Ltd.

(57) ABSTRACT

A MOS transistor, an insulating film and a connecting plug are formed on a silicon substrate, and a surface of the insulating film undergoes a CMP polishing, followed by formation of reflectors. Thereafter, a SiN film is formed as a cover film on the reflectors. Next, SOG is coated onto the cover film, and gaps between the reflectors are buried by the SOG. Subsequently, an SOG film undergoes a CMP polishing using the cover film as a stopper, and a surface thereof is flattened.

5 Claims, 17 Drawing Sheets

MODULE FOR REFLECTION TYPE LIQUID CRYSTAL DISPLAY DEVICE, METHOD OF MANUFACTURING THE SAME, AND REFLECTION TYPE LIQUID CRYSTAL DISPLAY DEVICE

BACKGROUND OF THE INVENTION

1. Field of the Invention

The present invention relates to a reflection type liquid crystal display device in which a switching device and a reflector are formed on a semiconductor substrate, and a liquid crystal is sealed between the semiconductor substrate and a canmo electrode, a module for use in the reflection type liquid crystal display device, and a method of manufacturing the same.

2. Description of the Prior Art

As a head mount display and a projection type display, a reflection type liquid crystal display device which is called a silicon chip-based liquid crystal has recently been paid attention to.

FIG. 1 is a schematic view showing a principle of a reflection type liquid crystal display device using the silicon chip-based liquid crystal, and FIG. 2 is an assembly view showing a constitution of the same reflection type liquid crystal display device.

The reflection type liquid crystal display device is constituted of a light source 51 composed of red-, green-, and blue-color light emitting diodes; a polarizer 52; an analyzer 53; and a liquid crystal on silicon (hereinafter referred to as a LCOS) unit 54.

The LCOS unit 54 is constituted of a plurality of miniaturized reflectors (electrode) 61 arranged in a matrix fashion; a silicon chip module 54a in which devices such as CMOSs (not shown) are formed; and a liquid crystal panel 54b located on the silicon chip module 54a. Furthermore, the liquid crystal panel 54b is composed of a sealing member 66; a glass substrate 67; and a liquid crystal layer 68 sealed therebetween. A common electrode 67a made of a transparent electrically-conductive material is formed on a lower surface of the glass substrate 67.

FIG. 3 is a schematic plan view of the silicon chip module 54a. As shown in FIG. 3, a number of miniaturized reflectors 61 formed of aluminum alloy are arranged in the silicon chip module 54a in a matrix fashion. A MOS transistor (switching device) 62 is formed in each of the reflectors 61. Gate electrodes of the MOS transistors 62 arranged in the lateral direction are connected to the same gate bus line 73b, and the drains of the MOS transistors 62 arranged in the longitudinal direction are connected to the same data bus line 76b. Furthermore, the source of each MOS transistor 62 is connected to corresponding one of the reflectors 61.

FIG. 4 is a section view of the silicon chip module 54a. A MOS transistor constituted of a gate electrode 73a, a source 72a and a drain 72b is formed on a silicon substrate 71. Note that the gate bus line 73b shown in FIG. 3 is formed in the same wiring layer as that of the gate electrode 73a.

An interlayer insulating film 74 is formed on the silicon substrate 71, and an intermediate wiring 76a and the data bus line 76b are formed on this interlayer insulating film 74. A plurality of connecting plugs 75a are buried in the interlayer insulating film 74, and the intermediate wiring 76a is connected to the source 72a of the MOS transistor via the connecting plugs 75a. The data bus line 76b is connected to the drain 72b of the MOS transistor.

An interlayer insulating film 77 is formed on the intermediate wiring 76a and the data bus line 76b. Moreover, the reflectors 61 are formed on the interlayer insulating film 77. A plurality of connecting plugs 78a are buried in the interlayer insulating film 77, and the reflector 61 is electrically connected to the source 72a of the MOS transistor via the connecting plug 78a, the intermediate wiring 76a and the connecting plug 75a.

In the reflection type liquid crystal display device constituted in the above described manner, a beam of light emitted from the light source 51 is made to be uniform in its oscillation direction when the beam of light passes through the polarizer 52, as shown in FIG. 1. The polarized light that has passed through the polarizer 52 travels through the liquid crystal panel 54b of the LCOS unit 54, and reaches the reflector 61. The reflected light by the reflector 61 passes through the liquid crystal panel 54b again, and then tends to the analyzer 53. For example, in the case where the liquid crystal panel 54b is a TN (Twisted Nematic) mode, the oscillation direction of the light is twisted by a fixed angle while the light travels from the reflector 61 to the liquid crystal panel 54b in a state where no voltage is applied between the reflector 61 and the common electrode 67a. On the other hand, when a sufficiently high voltage is applied between the reflector 61 and the common electrode 67a, the oscillation direction of the light hardly change while the light travels from the reflector 61 to the liquid crystal panel 54b. For this reason, when the polarizer 52 and the analyzer 53 are disposed so that the light is shield with no application of a voltage, the light comes to transmit therethrough with an application of the voltage. By controlling the application voltage for each reflector 61, a desired image is displayed.

Incidentally, in the case of the reflection type liquid crystal display device having the above-described structure, it is important that a surface of the reflector 61 is flat. Therefore, before the reflector 61 is formed, a surface of the interlayer insulating film 77 is polished to be flat by use of, for example, a CNP (Chemical Mechanical Polishing) before the reflector 61 is formed.

However, the inventors of this application of the present invention consider that there are the problems described below in the foregoing conventional reflection type liquid crystal display device. To be specific, the surface of the silicon chip module 54a has irregularities equivalent to a thickness of the reflector 61. Therefore, if air enters gaps between the reflectors 61, a dielectric constant varies, and this causes a poor color tone and the like. In order to prevent such drawback, it is conceived that after the reflector is formed, an insulating material is buried in gaps between the reflectors by use of a method to coat SOG (Spin On Glass), to deposit a plasma oxide film or the like. However, the insulating substance such as SOG is attached onto the reflector, variations of gaps between the reflector and the liquid crystal are brought about, thus causing a poor color tone.

Although removal of the insulating substance attached onto the reflector by etching is also conceived, the surface of the reflector is corroded during etching of the insulating substance, and hence a reflection efficiency of the light is lowered.

SUMMARY OF THE INVENTION

The object of the present invention is to provide a reflection type liquid crystal display device which has a good display quality, a module for use in the reflection type liquid crystal display device and a method of manufacturing the same by burying an insulating substance in gaps between its reflectors and flattening a surface of its semiconductor chip module.

The module for use in the reflection type liquid crystal display device of the present invention comprises a plurality of switching elements formed on a semiconductor substrate, a first insulating film formed on the semiconductor substrate, a plurality of reflectors formed on the insulating film, each of which is electrically connected to corresponding one of switching elements via corresponding one of connecting plugs buried in the insulating film, and a second insulating film buried in a gap between the reflectors, the second insulating film securing flatness of a surface of the reflector.

In the present invention, the second insulating film is buried in the gap between the reflectors, and the second insulating film secures the flatness of the surface of the module. With such structure, a good display characteristic can be obtained.

A method of manufacturing the module for use in the reflection type liquid crystal display device of the present invention comprises: a switching elements formation step for forming a plurality of switching elements on a semiconductor substrate; a first insulating film formation step for forming a first insulating film on the semiconductor substrate; a connecting plug formation step for forming a connecting plug buried in the first insulating film so as to be connected to the switching element; a reflector formation step for forming a plurality of reflectors electrically connected to the respective switching elements via the connecting plug; a second insulating film formation step for forming a second insulating film on the semiconductor substrate, the second insulating film burying gaps between the reflectors; and a chemical mechanical polishing step for chemical mechanical polishing the second insulating film.

In the present invention, after the reflectors are formed, the second insulating film is buried in the gaps between the reflectors. Then, the surface of the second insulating film is flattened by a CMP (Chemical Mechanical Polishing). Thus, gaps between the reflectors and liquid crystals are made to be uniform, and a good display characteristic can be obtained.

In this case, when a cover film made of silicon nitride (SiN) or silicon oxynitride (SiON) is formed on the reflector, and the second insulating film is subjected to the CMP using the cover film as a stopper, it is possible to prevent the reflector from being polished. When the second insulating film is made of SOG or HDP (High Density Plasma), the second insulating film can be used as a stopper during the CMP because SiN and SiON shows a higher hardness than that of this insulating film. Moreover, oxidation of the reflector is prevented by this cover film, and a good reflection characteristic can be maintained for a long period of time.

Also when the cover film is made of titanium nitride (TiN) or titanium (Ti), the cover film can be used as a stopper during the CHP. Note that since the transparency of the cover film is low, the cover film must be removed after the CHP in this case.

DESCRIPTION OF THE PREFERRED EMBODIMENTS

Embodiments of the present invention will be described with reference to the accompanying drawings below.

First Embodiment

Figure 1:
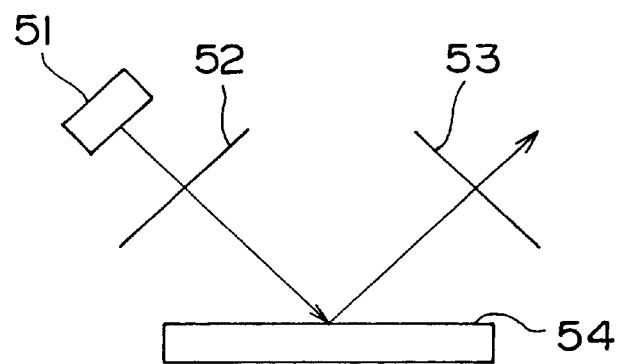
FIG. 1 is a schematic view showing a principle of a reflection type liquid crystal display device using silicon chip-based liquid crystal.
Figure 2:
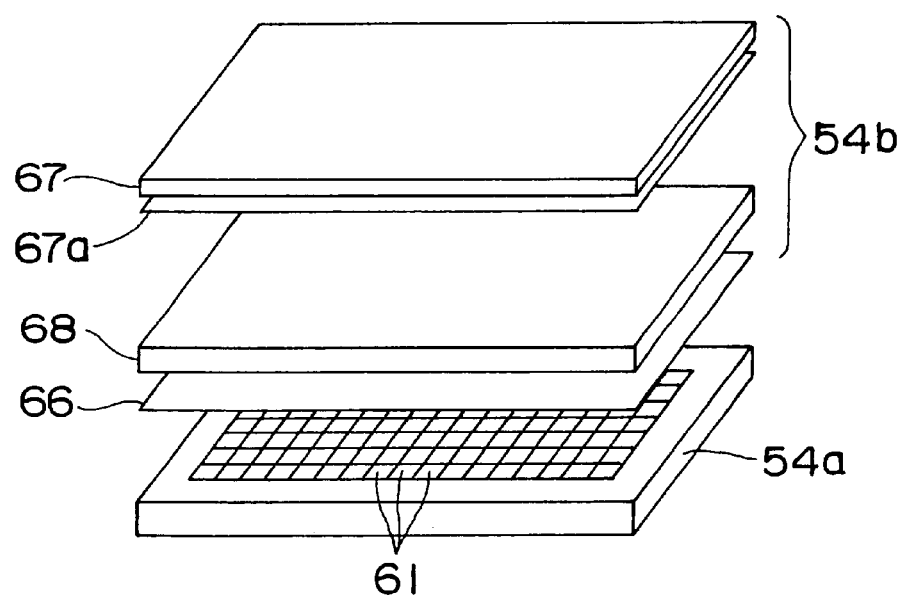
FIG. 2 is an assembly view showing a constitution of the reflection type liquid crystal display device of FIG. 1.
Figure 3:
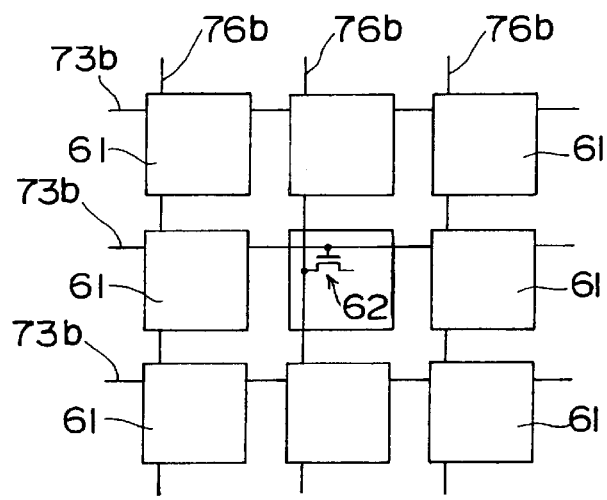
FIG. 3 is a schematic plan view showing a silicon chip module.
Figure 4:
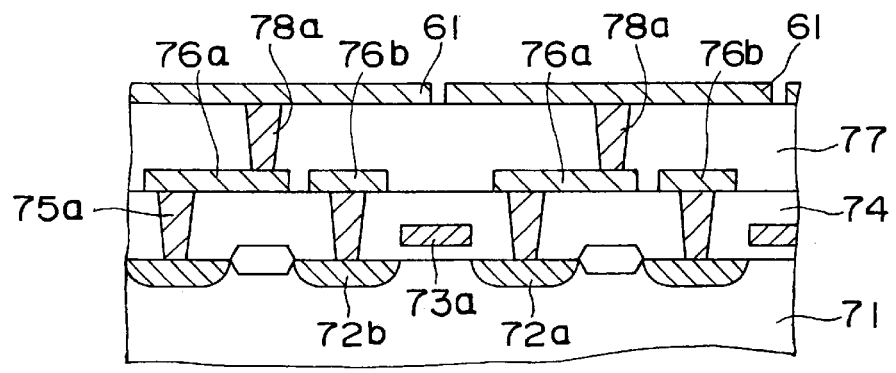
FIG. 4 is a section view showing a conventional silicon chip module.
Figure 5A:
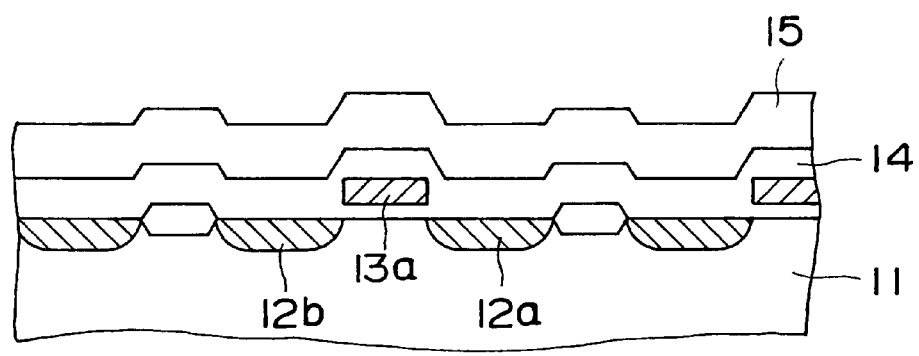
FIGS. 5A to 5O are section views showing a method of manufacturing a silicon chip module of a reflection type liquid crystal display device according to a first embodiment of the present invention.
Figure 5B:
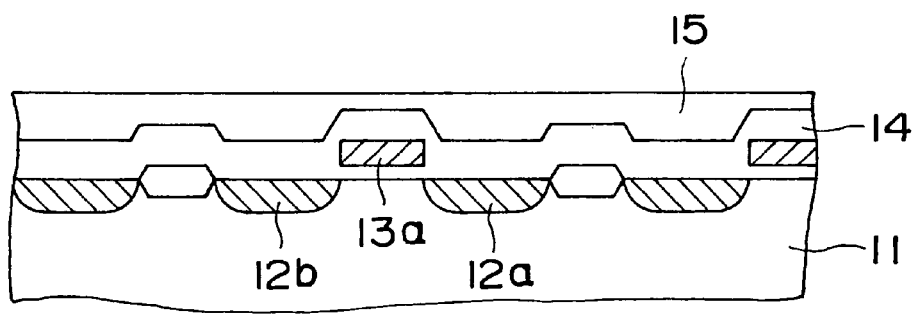
Figure 5C:
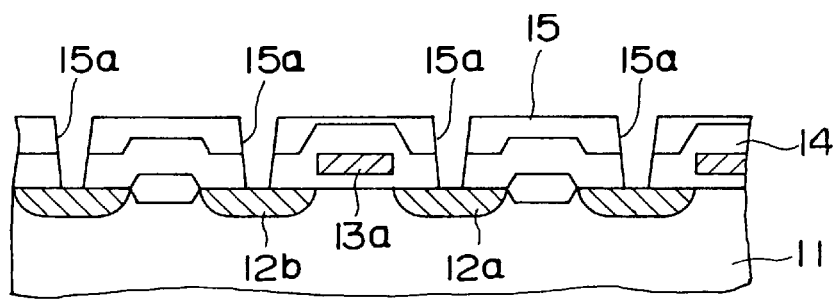
Figure 5D:
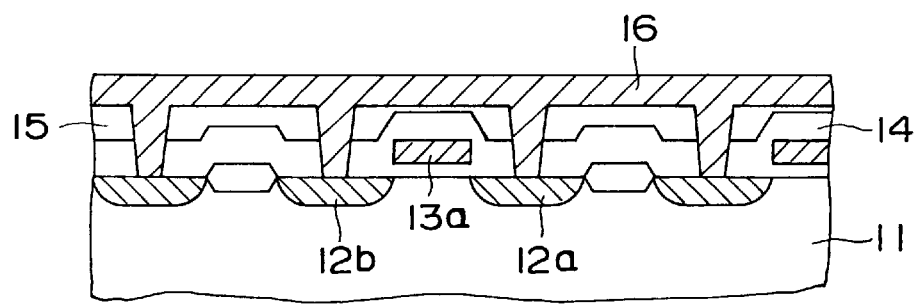
Figure 5E:
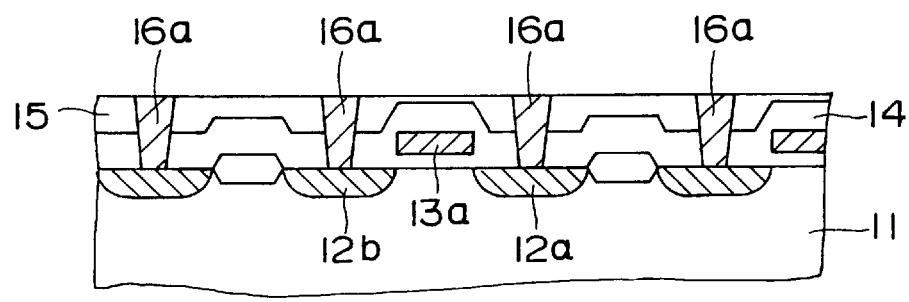
Figure 5F:
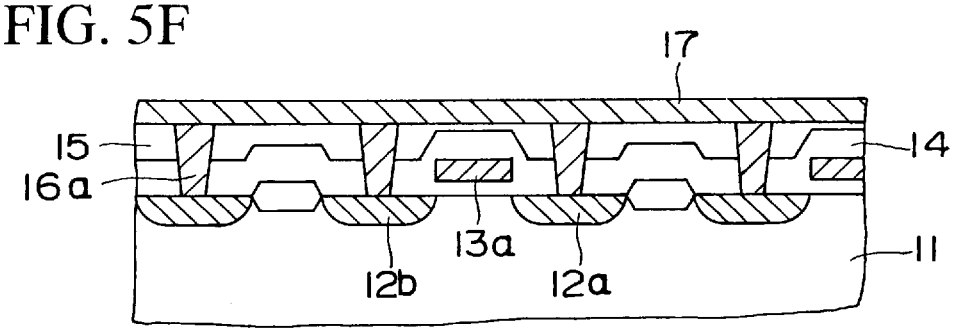
Figure 5G:
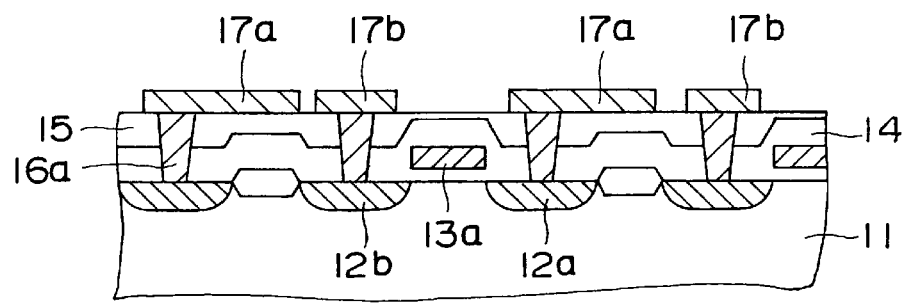
Figure 5H:
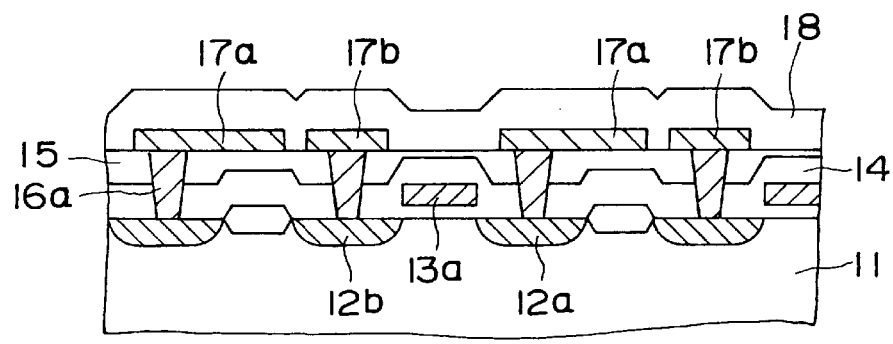
Figure 5I:
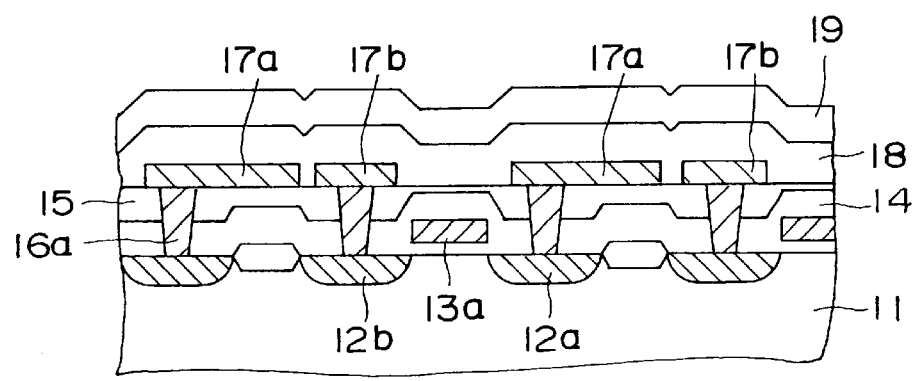
Figure 5J:
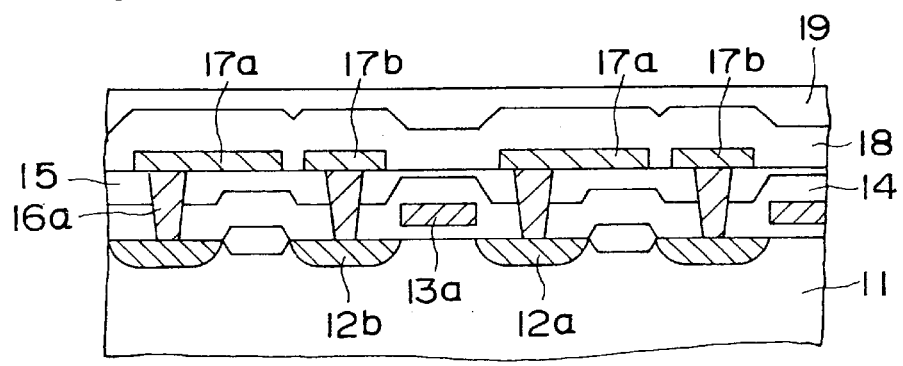
Figure 5K:
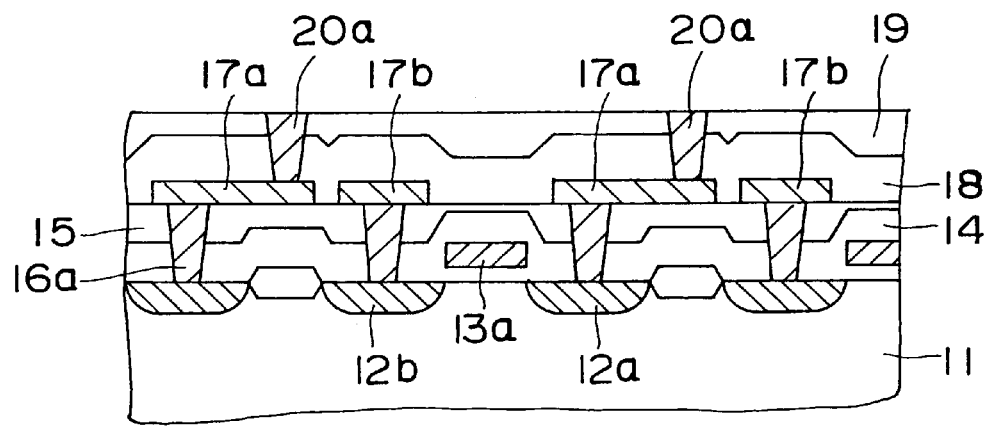
Figure 5L:
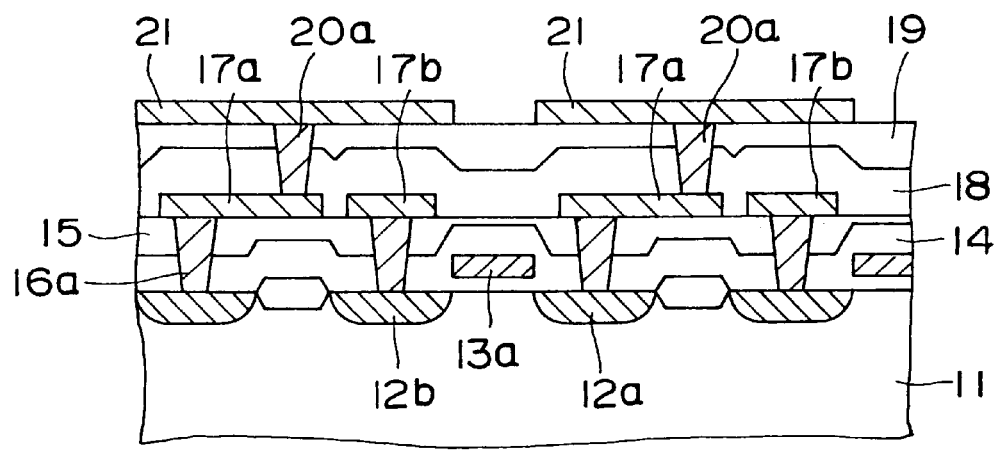
Figure 5M:
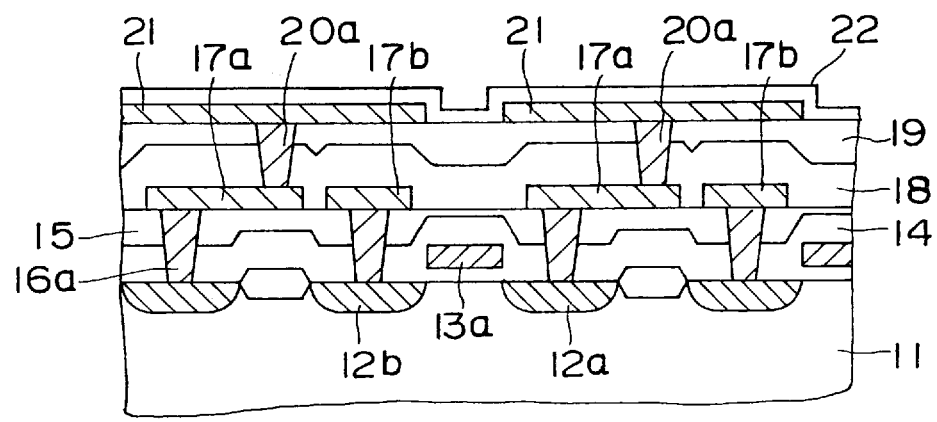
Figure 5N:
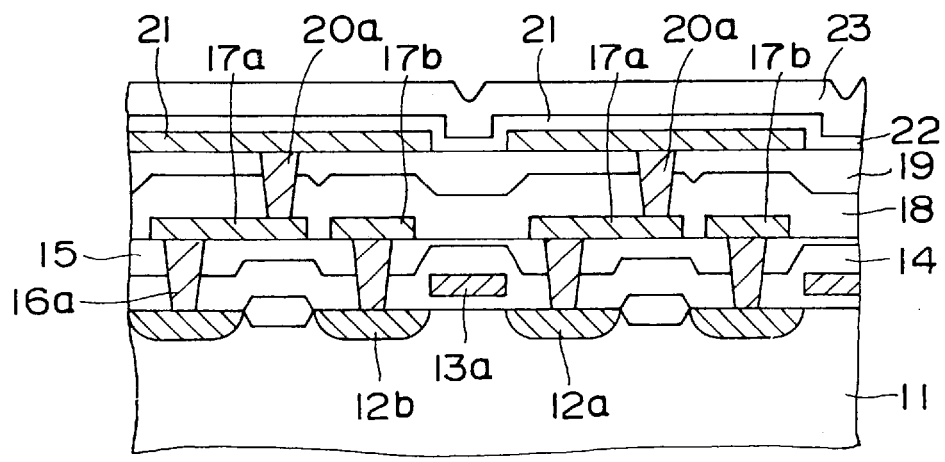
Figure 5O:
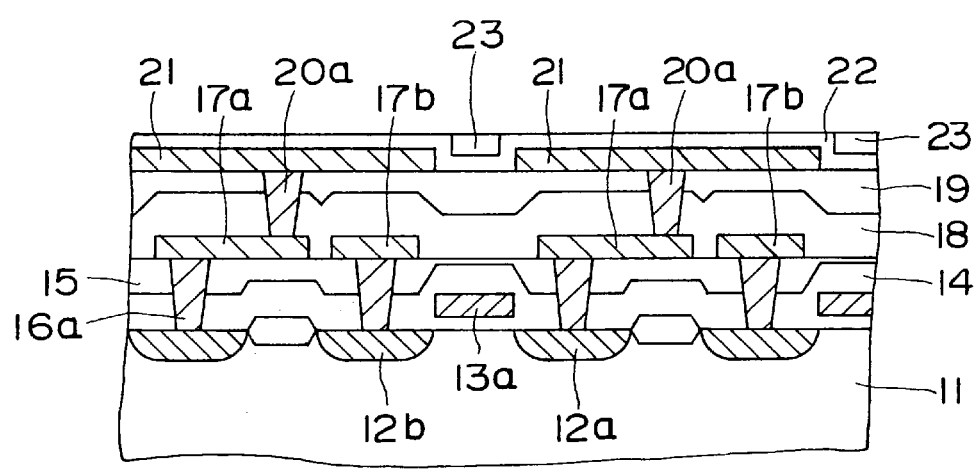
Figure 6:
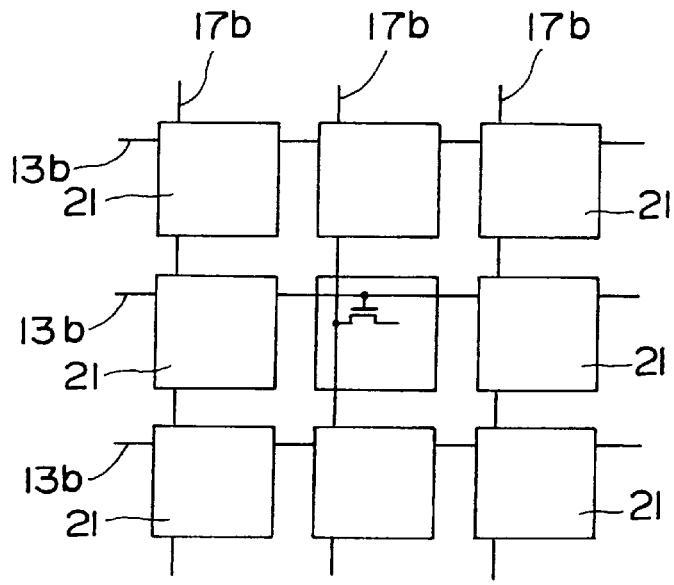
FIG. 6 is a schematic top plan view of the silicon chip module of the first embodiment of the present invention.
Figure 7:
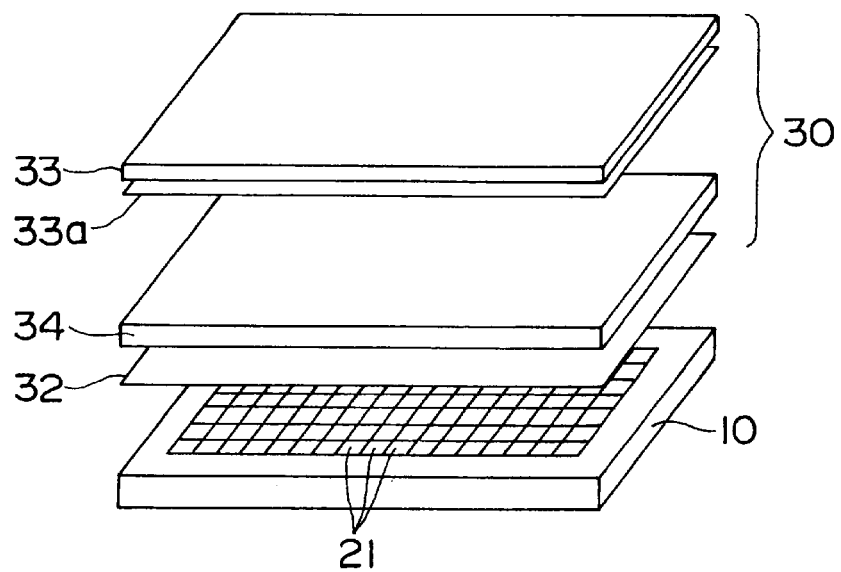
FIG. 7 is an assembly view of the reflection type liquid crystal display device according to the first embodiment of the present invention.

FIGS. 5A to 5O are section views showing a method of manufacturing a silicon chip module of a reflection type liquid crystal display device in the order of manufacturing steps according to a first embodiment of the present invention. Furthermore, FIG. 6 is a schematic top view of the silicon chip module manufactured by the method shown in FIGS. 5A to 5O, and FIG. 7 is an assembly view showing a constitution of the reflection type liquid crystal display device of this embodiment.

First, a predetermined MOS (CMOS) is formed on a silicon substrate 11 by use of a manufacturing technique of known semiconductor integrated circuits, as shown in FIG. 5A. To be more specific, a gate electrode 13a and a gate bus line 13b are formed on the silicon substrate 11, an insulating film interposing therebetween. Impurities are introduced into portions of the silicon substrate 11 in the vicinity of both sides of the gate electrode 13a, and thus a source 12a and a drain 12b are formed.

Next, using an HDP (High Density Plasma) method, on the entire top surface of the silicon substrate 11, an HDP film (silicon oxide film) 14 is formed to a thickness of about 800 nm. Thereafter, as a sacrifice film, a plasma oxide film (silicon oxide) 15 is formed to a thickness of about 1300 rum by a plasma CVD method. As for conditions for forming the HDP film 14 by the HDP method, SiH4 gas, Ar gas and $O_2$ gas are, for example, used, pressure is 10 mTorr, LF power is 3000 W, HF power is 2100 W, and temperature is 350 degrees (° C.). Furthermore, a flow rate of the $SiH_4$ gas is 80 sccm, and a flow rate of the Ar gas is 440 sccm, and a flow rate of the $O_2$ gas is 115 sccm.

In this embodiment, though the interlayer insulating film is formed by laminating the HDP film 14 and the plasma oxide film 15, the interlayer insulating film may be formed only by the HDP film or only by the plasma oxide film. Furthermore, the interlayer insulating film may be formed in such a manner that the plasma oxide film is formed to a thickness of about 500 nm, SOG having a thickness of 500 nm is coated onto the plasma oxide film and cured, and thus the plasma oxide film is formed to a thickness of 1000 nm.

Next, as shown in FIG. 5B, either plasma oxide film 15 or the HDP film 14 undergoes a CMP polishing, and the surface thereof is flattened. At this time, a thickness of the insulating film on the gate electrode 13a and the gate bus line 13b, which is a sum of the thickness of the HDP film 14 and the thickness of the silicon oxide film 15, is made to be about 1000 nm.

Subsequently, a resist film (not shown) for forming contact holes are formed on the plasma oxide film 15. Then, the plasma oxide film 15 and the HDP film 14 are etched using the resist film as an etching mask, and contact holes 15a reaching a source 12a and a drain 12b of a MOS transistor is formed, as shown in FIG. 5C. Thereafter, the resist film used as the etching mask is peeled off.

Next, on the entire top surface of the silicon substrate 11, formed is a TiN film (not shown) having a thickness of about 50 nm as a glue-layer, and then, as shown in FIG. 5D, W (tungsten) is deposited on the TiN film until the contact holes 15a are buried. Thus, a W film 16 is formed. At this time, the thickness of the W film 16 on the plasma oxide film 15 is made to be about 400 nm.

Thereafter, as shown in FIG. 5E, the W film 16 and the TiN film which are formed on the plasma oxide film 15 are removed by the CMP polishing. Thus, a connecting plug 16a buried in the contact holes 15a are formed. Note that the TiN film and the W film on the plasma oxide film 15 may be removed by etch back. However, since the etch back may cause recesses on the upper portion of the contact hole 15a and deteriorate flatness of a conductive film to be formed thereon, the surface should preferably be flattened by the CMP polishing as described above.

Next, as shown in FIG. 5F, Ti having a thickness of 40 nm, TiN having a thickness of 30 nm, AlCu having a thickness of 500 rum, Ti having a thickness of 5 rum and TiN having a thickness of 100 nm are sequentially laminated in this order on the entire top surface of the silicon substrate 11, and thus a conductive film 17 is formed. The materials forming the conductive film are not limited to these, and it is possible to employ various kinds of conductive materials.

Thereafter, the conductive film 17 is patterned by photolithography, an intermediate wiring 17a electrically connected to the source 12a of the MOS transistor and a data bus line 17b electrically connected to the drain 12b thereof are formed simultaneously, as shown in FIG. 5G.

Next, as shown in FIG. 5H, an HDP film (silicon oxide film) 18 is formed to a thickness of about 800 nm on the entire top surface of the silicon substrate 11 by an HDP method. Thereafter, as shown in FIG. 5I, a plasma oxide film (silicon oxide film) 19 is formed as a sacrifice film to a thickness of about 1300 nm on the HDP film 18 by a plasma CVD method.

Next, as shown in FIG. 5J, the surface of the plasma oxide film 19 undergoes the CMP polishing to be flattened. At this time, the thickness of the insulating film on the intermediate wiring 17a and the data bus line 17b, composed of the HDP film and the plasma oxide film 19, is made to be about 1000 nm.

Subsequently, a resist film (not shown) for forming contact holes are formed on the plasma oxide film 19, and then the plasma oxide film 19 and the HDP film 18 are etched using the resist film as an etching mask, and contact holes reaching the intermediate wiring 17a are formed. Then, after removal of the resist film used as the etching mask, a TiN film (not shown) is formed as a glue layer to a thickness of about 50 nm on the entire top surface of the silicon substrate 11, and moreover W (tungsten) is deposited until the contact holes are buried, thus a W film is formed. Thereafter, the W film and the TiN film, which are formed on the plasma oxide film 19, are removed by the CMP polishing. Thus, as shown in FIG. 5K, a connecting plugs 20a buried in the contact holes are formed.

Next, as shown in FIG. 5L, Ti and TiN are laminated to thicknesses of 40 nm and 30 nm on the entire top surface of the silicon substrate 11, and either AlCu or AlCuTi is laminated as the uppermost layer to a thickness of 500 nm, thus a conductive film is formed. A reflector 21 is formed by patterning the conductive film.

Subsequently, as shown in FIG. 5M, a cover film 22 made of either silicon nitride (SiN) or silicon oxynitride (SiON) is formed to a thickness ranging from several tens to several hundreds nm on the entire top surface of the silicon substrate 11, and thus the surface of the reflector 21 is covered with the cover film 22.

Thereafter, as shown in FIG. 5N, SOG is coated onto the cover film 22, thus an SOG film 23 is formed. In this case, though the thickness of the SOG film 23 is not especially defined, a gap between the reflectors 21 adjacent to each other must be buried by the SOG film.

Next, as shown in FIG. 5O, the surface of the SOG film 23 is flattened by the CHP polishing. At this time, since the cover film 22 made of either SiN or SiON shows a hardness higher than the SOG film 23, a polishing speed becomes slower at the time the cover film 22 is exposed. Accordingly, the CMP polishing can be finished before the reflector 21 is polished. In the above-described manner, a silicon chip module 10 shown in FIG. 7 is manufactured.

On the other hand, a liquid crystal panel 30 shown in FIG. 7 is prepared. This liquid crystal panel 30 is constituted of a sealing member 32, a glass substrate 33 and a liquid crystal 34 sealed therebetween, and a colmon electrode 33a made of a transparent conductive material such as ITO (indium-tin oxide) is formed on the lower surface of the glass substrate 33. Then, the liquid crystal panel 30 is bonded onto the silicon chip module 10. In the above-described manner, the reflection type display device of the first embodiment is manufactured.

According to this embodiment, the surface of the reflector 21 is covered with the cover film 22 made of either SiN or SiON, and the gap between the reflectors 21 adjacent to each other is buried by the SOG. Thereafter, the SOG is flattened by the CHP polishing. Therefore, a step difference in the surface of the silicon chip module 10 is removed, and intervals between each reflector 21 and the liquid crystal 34 are made to be even. Moreover, the gap between the reflector 21 and the liquid crystal 34 can be controlled within an extremely narrow range, which is as small as several ten to several hundreds rum. Thus, deterioration of color tone owing to unevenness of the surface can be avoided, and an image display with an extremely high quality can be obtained.

Moreover, in this embodiment, since the reflector 21 is covered with the cover film 22, occurrence of a problem such as corrosion of the reflector 21 can be prevented.

In this embodiment, on the reflector 21, the cover film 22 made of either SiN or SiON is used as the stopper in the CMP polishing. However, an SOG film 23 may be formed without forming the cover film 22. In this case, it is important that the CNP polishing should be finished when the reflector 21 is exposed, and excessive polishing can be prevented by use of an end point detector and the like which detects an end point of the CHP polishing, for example, by oscillation change.

Second Embodiment

Figure 8A:
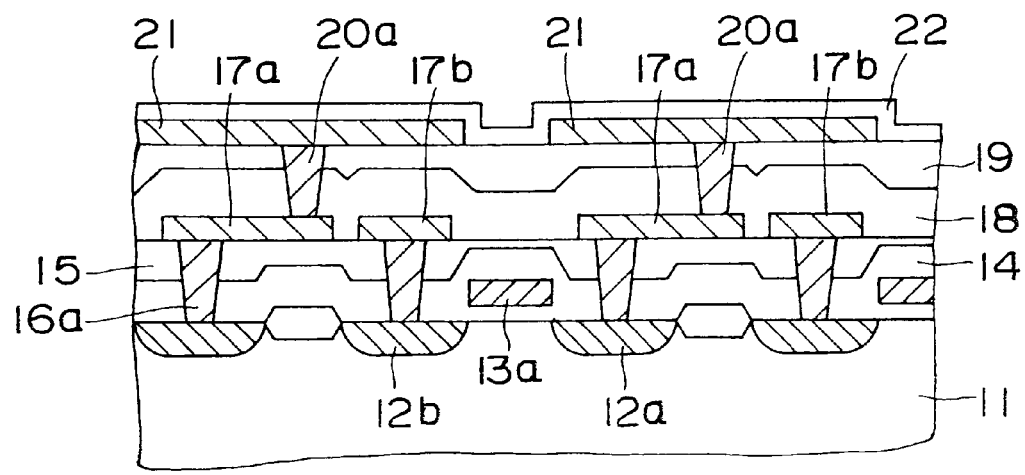
FIGS. 8A to 8C are section views showing a method of manufacturing a silicon chip module of a reflection type liquid crystal display device according to a second embodiment of the present invention.
Figure 8B:
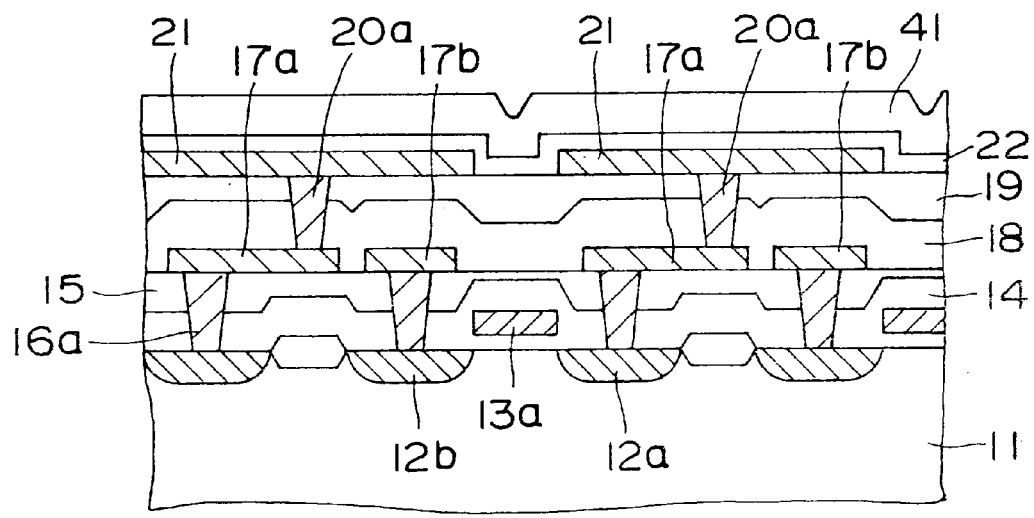
Figure 8C:
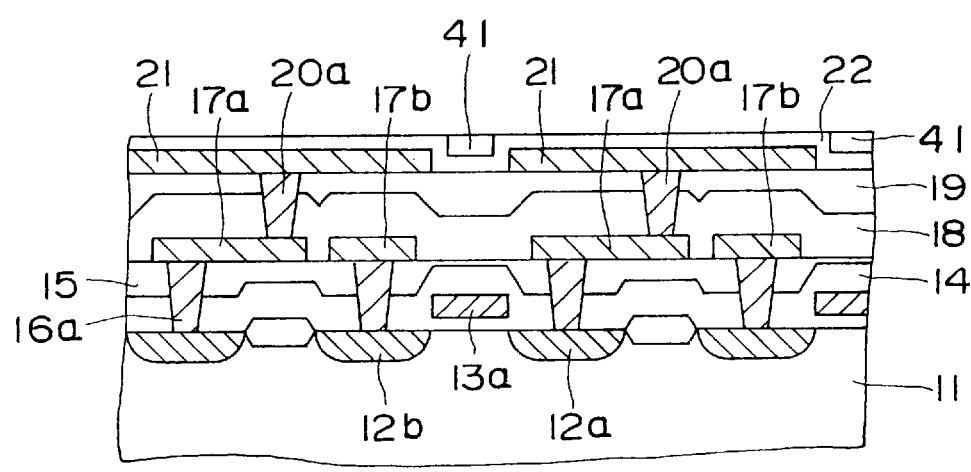

FIGS. 8A to 8C are section views showing a method of manufacturing a silicon chip module of a reflection type liquid crystal device according to the second evident of the present invention. Since the second embodiment differs from the first embodiment in steps after the formation of the reflector 21, the same constituent components of FIGS. 8A to 8C as those in FIGS. 5A to 5O are denoted by the same reference numerals, and detailed descriptions for them are omitted.

First, as shown in FIG. 8A, a gate electrode 13a, a gate bus line (not shown), an intermediate wiring 17a, a data bus line 17b and a reflector 21 of a MOS transistor are formed on a silicon substrate 11 similarly to the first embodiment. Then, the reflector 21 is covered with a cover 22 formed of either SiN or SiON.

Next, as shown in FIG. 8B, an HDP film 41 is formed on the cover film 22 by an HDP method, and a gap between the reflectors 21 adjacent to each other is buried by the HDP film 41. The HDP film 41 is formed under such conditions that $SiH_4$ gas, Ar gas and $O_2$ gas are used, pressure is 10 mTorr, LF power is 3000 W, HF power is 2100 W, and temperature is 350° C. Furthermore, a flow rate of the $SiH_4$ gas is controlled to 80 sccm; a flow rate of the Ar gas, 440 sccm; and a flow rate of the $O_2$ gas, 115 sccm. Although a thickness of the HDP film 41 is not especially defined, a gap between the reflectors 21 adjacent to each other must be buried by the HDP film 41.

Note that instead of the HDP film 41, formation of a plasma oxide film (silicon oxide film) using an ordinary parallel plate type plasma apparatus is conceived. However, the oxide film formed by the parallel plate type plasma apparatus is apt to be influenced by unevenness of a base layer, and voids (vacancies) occur in concave portions, resulting a defective display. Accordingly, it is desirable that the HDP film as in this embodiment or the SOG film as in the first embodiment is used as the insulating film for burying the gap between the reflectors 21.

Next, as shown in FIG. 8C, the surface of the HDP film 41 is flattened by the CNP polishing. At this time, since the cover film 22 made of either SiN or SiON shows a hardness higher than that of the HDP film 41, the cover film 22 functions as a stopper, and the polishing can be finished before the reflector 21 is polished. In the above-described manner, a silicon chip module is completed.

Thereafter, a liquid crystal panel is bonded onto the silicon chip module similarly to the first embodiment. Thus, a reflection type liquid crystal display device of the second embodiment is manufactured.

In this embodiment, since the HDP film 41 formed on the reflector 21 is polished by the CMP polishing, the silicon chip module shows very high surface flatness, so that a reflection type liquid crystal display device with a good display quality can be manufactured. Furthermore, since the cover film 22 made of either SiN or SiON is used as the stopper in performing the CMP polishing for the HDP film 41, it is possible to prevent the reflector 21 from being polished.

Note that the HDP film 41 may be formed without forming the cover film 22. In this case, by use of an end point detector and the like, it is important that care must be taken so as not to excessively polish the reflector 21.

Third Embodiment

Figure 9A:
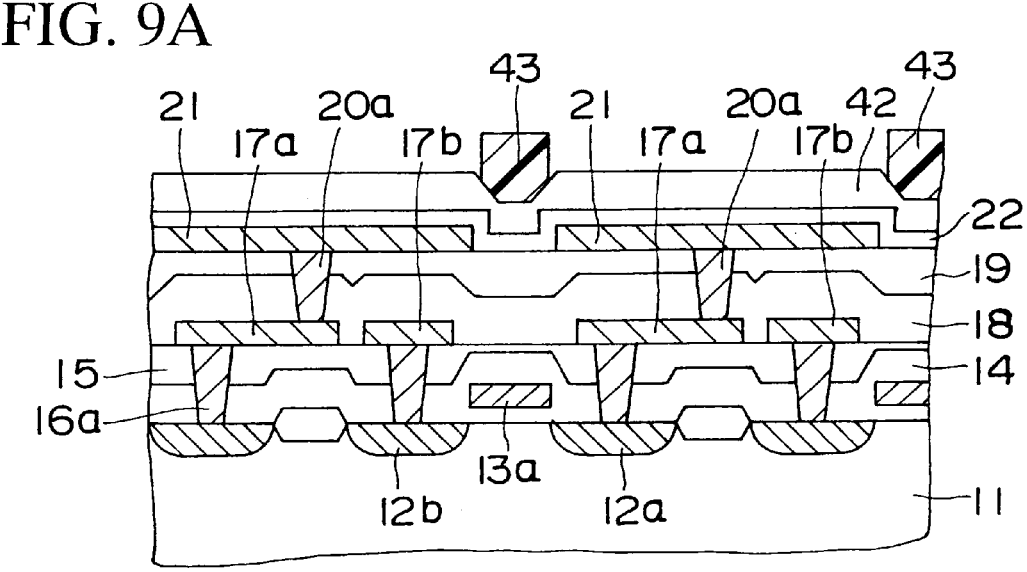
FIGS. 9A to 9C are section views showing a method of manufacturing a silicon chip module of a reflection type liquid crystal display device according to a third embodiment of the present invention.
Figure 9B:
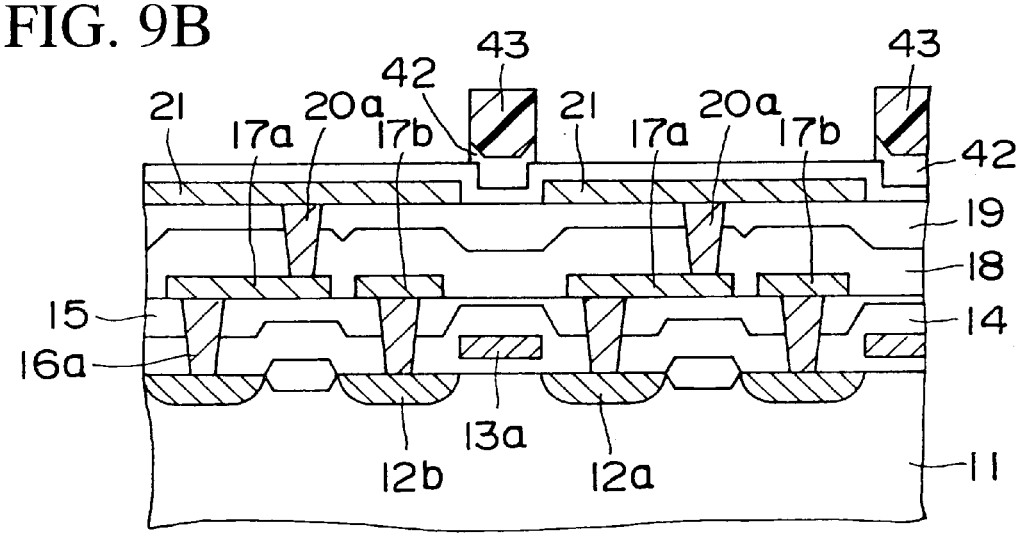
Figure 9C:
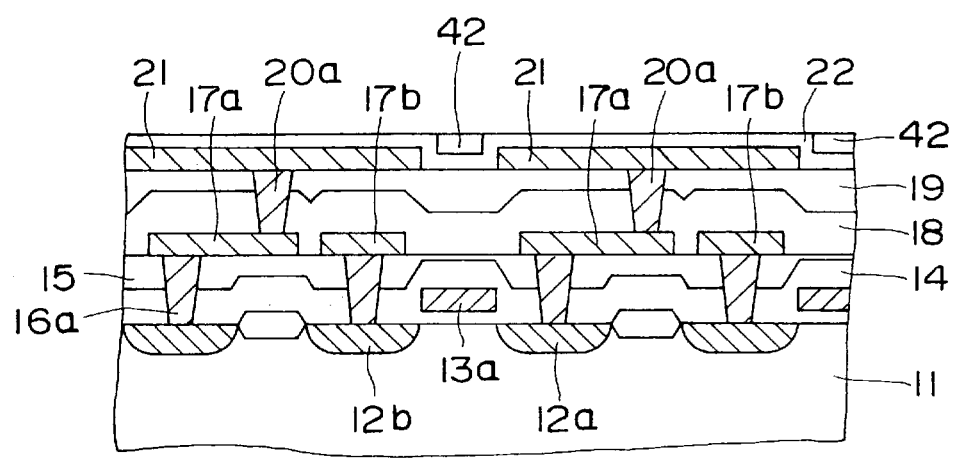

FIGS. 9A to 9C are section views showing a method of manufacturing a silicon chip module of a reflection type liquid crystal display device according to a third embodiment of the present invention. Since the third embodiment differs from the first embodiment in steps after the formation of the reflector 21, the same constituent components of FIGS. 9A to 9C as those in FIGS. 5A to 5O are denoted by the same reference numerals, and detailed descriptions for them are omitted.

First, as shown in FIG. 9A, a MOS transistor, a gate bus line, an intermediate wiring 17a, a data bus line 17b, a reflector 21 and the like are formed on a silicon substrate 11, similarly to the first embodiment. Then, the reflector 21 is covered with a cover film 22 formed of either SiN or SiON.

Thereafter, an HDP film 42 is formed on the cover film 22 by an HDP method, and a gap between the reflector 21 adjacent to each other is buried by the HDP film 42. Then, photoresist is coated on the HDP film 42, and a resist film 43 is formed on a region between the reflectors 21 after exposure and developing steps.

Next, the HDP film 42 is etched using the resist film 43 as an etching mask. At this time, the HDP film 42 may be etched until the cover film 22 exposed as shown in FIG. 9B, or alternatively etching of the HDP film 42 may be finished before the cover film 22 is exposed. Thereafter, the resist film 43 used as the etching mask is removed.

Next, as shown in FIG. 9C, the surface of the HDP film 42 left is flattened by the CMP polishing. Then, the CMP polishing is finished at the time a step difference between the HDP film 42 and the cover film 22 is removed. In the above-described manner, the silicon chip module is completed.

Thereafter, a liquid crystal panel is bonded onto the silicon chip module similarly to the first embodiment. Thus, the reflection type liquid crystal display device of the third embodiment is manufactured.

In the case where the HDP film 43 is formed thick on the cover film 22, the cover film 22 exerts less effect as the stopper when the HDP film 43 is polished only by the CMP polishing, the flatness of the HDP film 43 may be damaged. Accordingly, by removing the HDP film 42 above the reflector 21 by etching similarly to this embodiment, or by lessening the thickness of the HDP film 42, the flatness of the HDP film 42 can be secured. Also in this embodiment, the same effect as those of the first embodiment can be obtained.

Fourth Embodiment

FIGS. 10A to 10D are section views showing a method of manufacturing a silicon chip module of a reflection type liquid crystal display device according to a fourth embodiment of the present invention. Since this embodiment differs from the first embodiment in steps after the formation of the reflector 21, the same constituent components of FIGS. 10A to 10D as those in FIGS. 5A to 5O are denoted by the same reference numerals, and detailed descriptions for them are omitted.

Figure 10A:
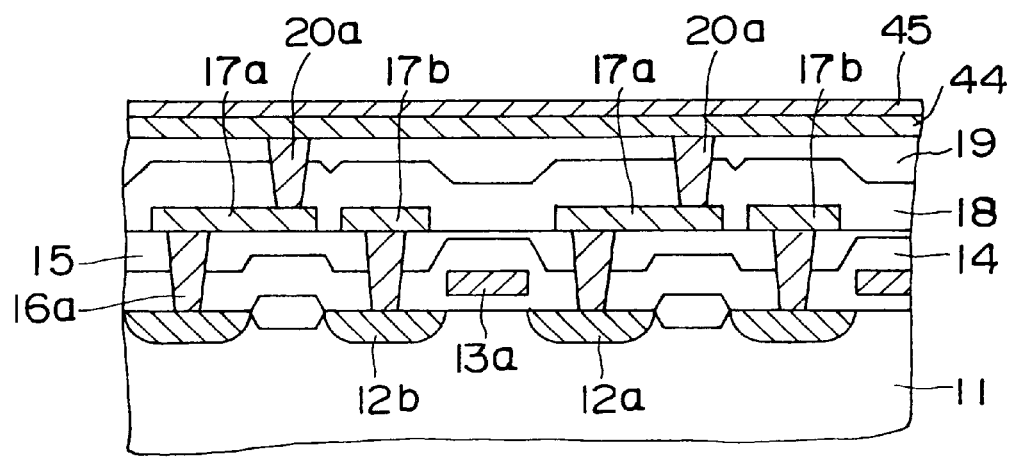
FIGS. 10A to 10D are section views showing a method of manufacturing a silicon chip module of a reflection type liquid crystal display device according to a fourth embodiment of the present invention.
Figure 10B:
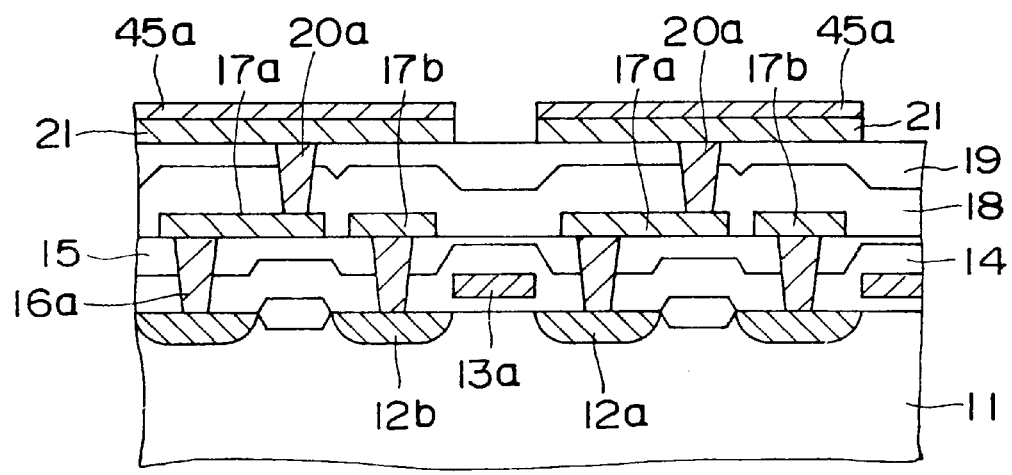

First, as shown in FIG. 10A, a MOS transistor, a gate bus line, an intermediate wiring 17a and a data bus line 17b are formed on a silicon substrate 11, similarly to the first embodiment, and an HDP film 18 and a plasma oxide film 19 are formed. Then, the surface of the plasma oxide film 19 is subjected to a CMP polishing, and thereafter a conductive film (AlCuTi/TiN/Ti) 44 serving as a reflector is formed.

Moreover, a TiN film 45 serving as a cover film is formed to a thickness ranging from several tens to several hundreds nm, for example, 50 nm. Thereafter, the TiN film 45 and the conductive film 44 are patterned by photolithography, thus the reflector 21 and the cover film 45a covering the reflector 21 are formed.

Figure 10C:
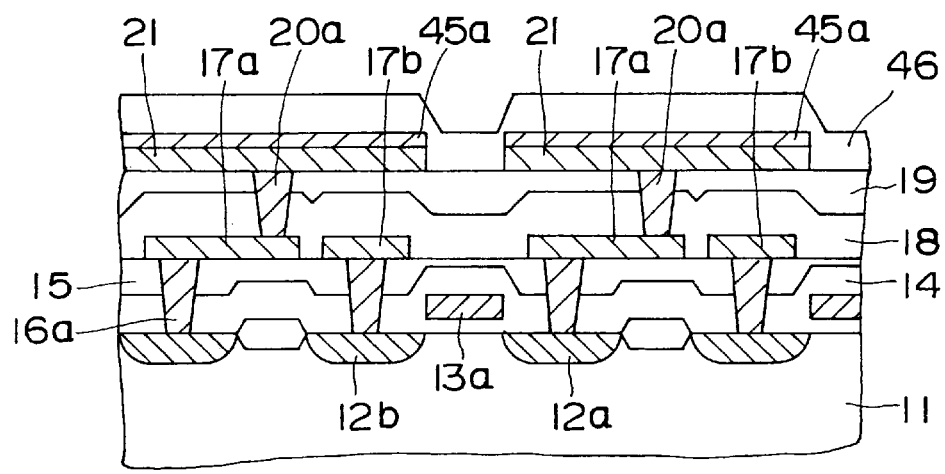

Next, as shown in FIG. 10C, SOG is coated on the entire top surface of the silicon substrate 11, thus an SOG film 46 is formed and a gap between the reflectors 21 adjacent to each other is buried by the SOG film 46.

Figure 10D:
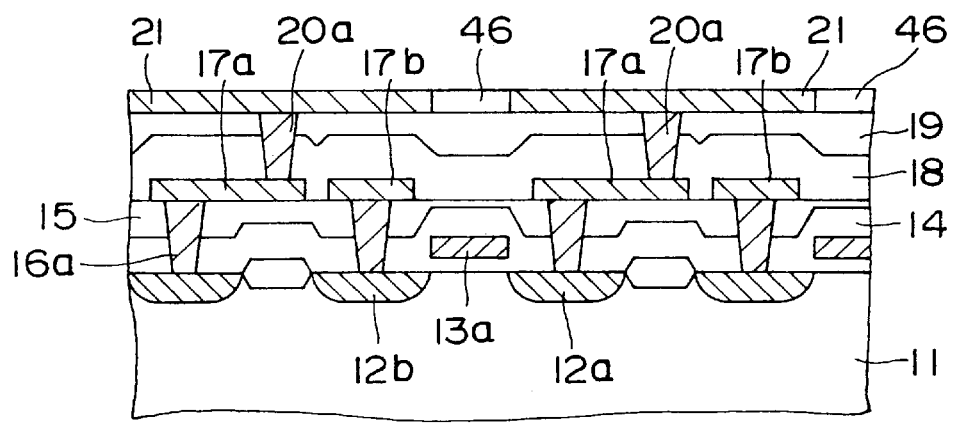

Subsequently, the SOG film 46 is polished by CMP until the cover film 45a is exposed. In this case, since the cover film 45a made of TiN shows a hardness higher than that of the SOG film 46, the cover film 45a serves as a stopper, thus the reflector 21 is prevented from being polished. Thereafter, the cover film 45a undergoes dry etching as shown in FIG. 10D, and thus the reflector 21 is exposed. The cover film 45a is dry-etched under such conditions that $CHF_3$ gas, $CF_4$ gas, Ar gas and $N_2$ gas are used, pressure is 300 mTorr, power is 1300 W, and a gap is 10 mm. Futhermore, a flow rate of the $HF_3$ gas is 40 sccm; a flow rate of the $CF_4$, 200 sccm; a flow rate of the Ar gas, 1000 sccm; and a flow rate of the $N_2$ gas, 60 sccm.

In the above-described manner, the silicon chip module is completed. Thereafter, a liquid crystal panel is bonded onto the silicon chip module similarly to the first embodiment. Thus, the reflection type liquid crystal display device of the fourth embodiment is manufactured. Also in this event, the same effects as those of the first embodiment can be obtained.

Note that in this event, the cover film 45a may be formed of a Ti film as substitute for the TiN film. Furthermore, the same effects can be obtained by burying the gap between the reflectors 21 by an HDP film instead of the SOG film 46. In addition, a resist film may be formed on above region between the reflectors 21 similarly to the third embodiment, the HDP film may be etched using the resist film as an etching mask, and thereafter a CHP polishing may be performed.

As described above, according to the present invention, the gap between the reflectors is buried by the SOG film or the HDP film and the like, and the surface is flattened by the chemical mechanical polishing, so that the flatness of the surface of the module for the reflection type liquid crystal display device is good. Thus, the image quality of the reflection type liquid crystal display device is increased.

Furthermore, by covering the reflector with the cover film made of silicon nitride, silicon oxynitride, titanium or titanium nitride, the cover film can be used as the stopper in performing the chemical mechanical polishing, and it is possible to prevent the reflector from being polished. Moreover, in the case where the cover film is made of silicon nitride or silicon oxynitride, the cover film need not to be removed, and an effect that the oxidation of the surface of the reflector can be prevented can be obtained.

Although the preferred embodiments of the present invention have been described in detail, it should be understood that various changes, substitutions and alternations can be made therein without departing from spirit and scope of the inventions as defined by the appended claims.

What is claimed is:

1. A method of manufacturing a module for use in a reflection type liquid crystal display device comprising:

a switching element formation step for forming a plurality of switching elements on a semiconductor substrate;

a first insulating film formation step for forming a first insulating film on said semiconductor substrate;

a connecting plug formation step for forming a connecting plug buried in said first insulating film, the connecting plug being connected to said switching elements;

a reflector formation step for forming a plurality of reflectors on said first insulating film, the reflectors being connected to the respective switching elements via the respective connecting plugs;

a cover film formation step for forming a cover film covering said reflectors;

second insulating film formation step for forming a second insulating film on said semiconductor substrate, the second insulating film burying gaps between the reflectors; and a chemical mechanical polishing step for polishing said second insulating film, said cover film being used as a stopper;

wherein said second insulating film formation step is followed by:

a step for forming an etching mask on said second insulating film in a region between said reflectors;

a step for etching said second insulating film; and a step for removing said etching mask, and wherein said second insulating film left after said etching is polished in said chemical mechanical polishing step.

2. The method of manufacturing a module for use in a reflection type liquid crystal display device according to claim 1, wherein said cover film is made of either silicon nitride or silicon oxynitride.

3. A method of manufacturing a module for use in a reflection type liquid crystal display device comprising:

a switching element formation step for forming a plurality of switching elements on a semiconductor substrate;

a first insulating film formation step for forming a first insulating film on said semiconductor substrate;

a connecting plug formation step for forming a connecting plug buried in said first insulating film, the connecting plug being connected to said switching elements;

a reflector formation step for forming a plurality of reflectors made of aluminum-based metal material, on said first insulating film, the reflectors being connected to the respective switching elements via the respective connecting plugs;

a cover film formation step for forming a cover film made of titanium or titanium nitride, on said reflectors;

a second insulating film formation step for forming a second insulating film on said semiconductor substrate, the second insulating film burying gaps between the reflectors; and a chemical mechanical polishing step for polishing said second insulating film, while using said cover film as a stopper, followed by removal of said cover film.

4. The method of manufacturing a module for use in a reflection type liquid crystal display device according to claim 1, wherein said second insulating film is formed by a coating of SOG or by a high density plasma growth.

5. The method of manufacturing a module for use in a reflection type liquid crystal display device according to claim 3, wherein said second insulating film is formed by a coating of SOG or by a high density plasma growth.

* * * * *